US006357774B1

(12) United States Patent
Nichols

(10) Patent No.: US 6,357,774 B1
(45) Date of Patent: Mar. 19, 2002

(54) CONVERSION KIT FOR CREATING AN OBSTACLE-MOUNTING WHEELCHAIR

(76) Inventor: Derek Nichols, 7545, Rue Centrale App. B, LaSalle, Quebec (CA), H8P 1K2

( * ) Notice: Subject to any disclaimer, the term of this patent is extended or adjusted under 35 U.S.C. 154(b) by 6 days.

(21) Appl. No.: 09/662,393

(22) Filed: Sep. 14, 2000

(30) Foreign Application Priority Data

Sep. 16, 1999 (CA) ............................................ 2282229

(51) Int. Cl.[7] ................................................ B62M 1/14

(52) U.S. Cl. ............................ 280/250.1; 280/DIG. 10; 280/304.1; 280/5.22; 180/9.21

(58) Field of Search ................................ 180/8.2, 9.21, 180/9.26, 9.28, 9.3, 9.32; 280/250.1, 304.1, DIG. 10, 47.38, 5.2, 5.22, 5.32; D12/131; 114/194

(56) References Cited

U.S. PATENT DOCUMENTS

| | | | | |
|---|---|---|---|---|
| 3,276,531 A | * 10/1966 | Hale et al. | | |
| 3,288,234 A | * 11/1966 | Feliz | | |
| 4,119,163 A | 10/1978 | Ball | | |
| 4,132,423 A | 1/1979 | Chant | | |
| 4,222,449 A | * 9/1980 | Feliz | 180/8 A | |
| 4,566,551 A | * 1/1986 | Feliz | 180/9.1 | |
| 5,308,098 A | 5/1994 | Shea | | |
| 5,395,129 A | * 3/1995 | Kao | 280/5.22 | |
| 5,413,367 A | 5/1995 | Ochiai | | |
| 5,641,030 A | 6/1997 | Toselli | | |
| 5,924,503 A | * 7/1999 | Lykken | 180/6.7 | |

FOREIGN PATENT DOCUMENTS

JP 52-44933 * 4/1977

* cited by examiner

*Primary Examiner*—Avraham H. Lerner
(74) *Attorney, Agent, or Firm*—Rosenman & Colin LLP

(57) ABSTRACT

A kit for converting a conventional wheelchair into an obstacle-mounting wheelchair, allowing an occupant to glide over obstacles such as sidewalk curbs. After removal of the large rear wheels and smaller front wheels of a conventional wheelchair, a pair of triangular belted support members are fitted to the frame of the wheelchair such that the frame hangs in a pendulum arrangement from the support members. The support members each have a rubber belt extending around their periphery on bearing mounts, and the wheelchair is propelled by an occupant grasping a portion of the two belts at the front of the support members and moving the belts downward. A pair of guide members are attached through spring-biased axles to a forward position on the wheelchair frame or a forward position on the support members. The guide members extend in an upward forward orientation, and rotate against bias when the front of the wheelchair encounters a curb or other obstacle. As they attempt to return to their unbiased position, the guide members lift the front part of the wheelchair, allowing the wheelchair to glide over obstacles with little reduction in forward speed.

11 Claims, 7 Drawing Sheets

FIG. 8
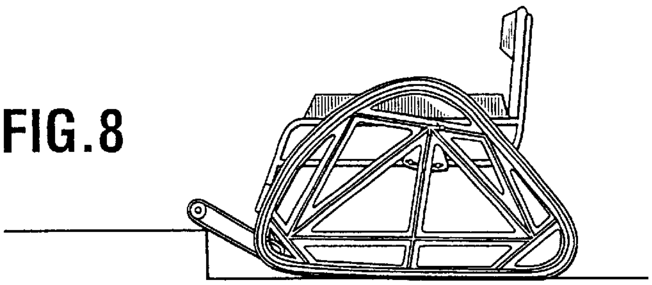
FIG. 9
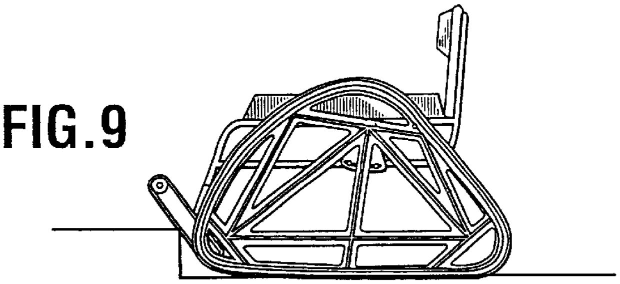
FIG. 10
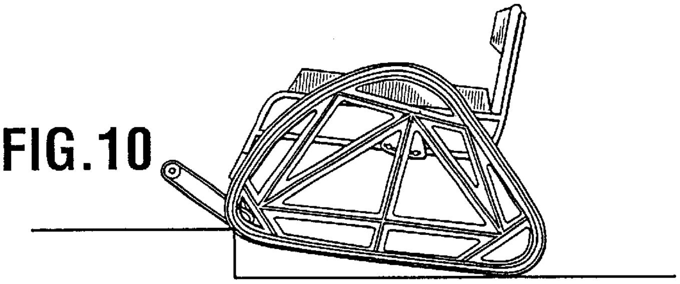
FIG. 11
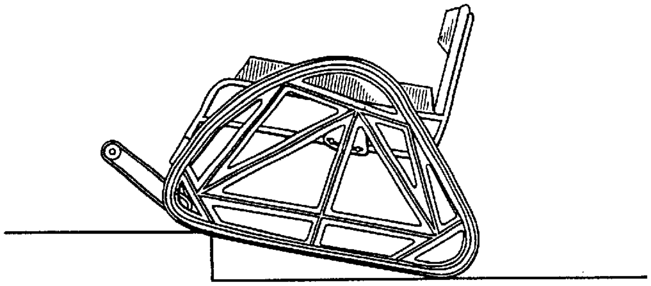
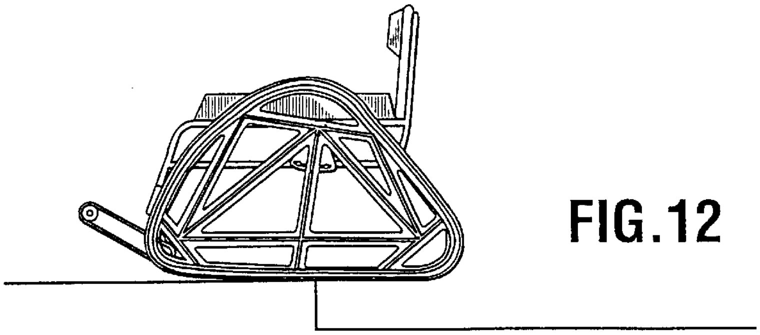
FIG. 12

CONVERSION KIT FOR CREATING AN OBSTACLE-MOUNTING WHEELCHAIR

FIELD OF THE INVENTION

The present invention relates to a wheelchair conversion kit, and more particularly to a kit for converting a conventional wheelchair into an obstacle-mounting wheelchair capable of surmounting obstacles such as curbs.

Until relatively recently, wheelchairs were built in only a limited number of conventional designs and offered little choice to buyers with respect to maneouvrability, weight, and flexibility. The advent of sports, leisure, and recreational activities for wheelchair athletes and enthusiasts has created a demand for improvements in the conventional wheelchair designs, and wheelchairs geared to athletes are now made of lighter materials and composites, streamlined for maneouvrability, and have improved wheels and a greater number of adjustment features. One direction being pursued is to design wheelchairs that can more easily carry occupants over rough terrain and obstacles without undue challenge or difficulty. There have been several approaches taken in this regard.

DESCRIPTION OF THE RELATED ART

One approach is disclosed in U.S. Pat. No. 5,308,098 (Brian J. Shea) which discloses a self-propelled all terrain wheelchair having a frame, a series of wheels mounted on each side of the frame, and a pair of continuous belts each mounted on a respective one of the sides of the frame so as to extend around one of the series of wheels. Spring-loaded handgrips, each positioned on a respective one of the belts, allow an occupant of the wheelchair to repetitively grasp and release the belts so as to propel the belts and thus the wheelchair forward. The wheels on the sides of the wheelchair are positioned such that each belt assumes the general shape of a parallepiped, with a front lower portion of each belt extending upwardly forwardly such that forward movement of the wheelchair allows obstacles such as sidewalk curbs to be overcome. A drawback of Shea's construction, however, is that his wheelchair abruptly changes its orientation upon coming against an obstacle and again after having surmounted the obstacle, causing stress for an occupant if the wheelchair is moving forward with any speed. Shea's belted construction does not include any means for absorbing shocks from impacting on an obstacle, and thus for smoothing an occupant's ride over the obstacle.

U.S. Pat. No. 4,132,423 (John B. Chant) discloses an attachment that may be pivotably fitted to the forward end of the frame of a conventional wheelchair so as to allow the wheelchair to mount or dismount from obstacles in its path, such as sidewalk curbs. This arrangement suffers the same drawbacks as Shea in that a wheelchair occupant has to come to a stop at the obstacle before using the pivoting attachment. The curb-climbing wheelchair disclosed in U.S. Pat. No. 4,119,163 (Ball) has a tandem pair of rear axles, a pair of powered first wheels on one axle driving a pair of powered second wheels on the other axle. The one axle is mounted on a frame of the wheelchair, while the other axle is secured by link arms to the one axle to rotate around the one axle, allowing the wheelchair to climb over an obstacle. The climbing action of the wheelchair is not an integrated part of its normal forward motion; rather, the wheelchair must stop its forward motion at the obstacle to allow the pair of rear axles to be orientated to surmount the obstacle.

U.S. Pat. No. 4,119,163 (Ball) discloses a wheelchair capable of climbing a sidewalk curb. It has a liftable front wheel and a rotatable tandem rear wheel unit that are co-ordinated in a stepped procedure. This arrangement would not allow the wheelchair to simply glide over curbs and other obstacles, as is of greater importance to a lighter and more versatile wheelchair to the heavier motorized version shown in Ball.

SUMMARY OF THE INVENTION

The object of the wheelchair of the invention is to convert a conventional wheelchair into a wheelchair that is capable of surmounting obstacles such as curbs without any noticeable reduction in speed. This is accomplished by removing the large rear wheels and small forward wheels from the frame of the conventional wheelchair, and then pivotally suspending the frame from a pair of belted support members. A pair of obstacle-mounting guide members are then attached to a forward part of the wheelchair, either to a front end of the frame or to a forward position on the belted support members. The guide members are spring-biased to assume a normally upward and forward orientation on the wheelchair, but on impacting a curb or other obstacle a forward end of each guide member rotates upward and backward against the bias before reaching a point where the bias begins to rotate them back in the opposite direction. As the guide members rotate back, they lift the forward end of the wheelchair and thus the forward end of the belted support members, allowing the wheelchair to glide up and over the curb in a continuous steady motion.

The invention is a wheelchair conversion kit for converting into an obstacle-mounting wheelchair a conventional wheelchair having a frame, a main pair of circular wheels each mounted on a respective opposite side of the rear of the frame, and a steerable smaller pair of circular wheels each mounted on a respective opposite side of the frame forward of the main pair of circular wheels. Parts of the kit are adapted to be mounted to the frame after removal of the main pair of wheels and the smaller pair of circular wheels.

The parts in the kit include a pair of belted support members and a pair of obstacle mounting guide members. Each of the belted support members is adapted to be fitted to a respective side of the frame, and includes a frame structure on the periphery of which are mounted a series of load-bearing rotatable members, an endless belt mounted on the series of load-bearing rotatable members, and a pendulum member having one end pivotally mounted on the frame structure. The load-bearing rotatable members configure peripheral movement of the belt around the frame structure into a defined path, a first segment of the defined path being adapted to extend proximate to a surface of ground traversed by the obstacle-mounting wheelchair. The first segment has a shallow convex curvature such that only a portion of the first segment of the defined path of the belt is in contact with the ground at any one time. The pendulum member is adapted to extend downwardly in use from its one end, and has its other end adapted to be attached to the respective side of the lower frame. Each obstacle-mounting guide member has a first part adapted to be attached at a forward position on the wheelchair, and has a second part connected by a respective resilient member to the first part and biased so as to normally extend in an upwardly forwardly direction on the wheelchair.

When the obstacle-mounting wheelchair encounters obstacles of a defined size or less during forward movement, each second part of the guide members initially rotates to compress the respective resilient member after first contact with the obstacle. The resilient members then act to return the second parts toward their original positions, the action of the second parts in returning toward such original positions lifting a forward end of the first segment of the defined path of each belt and thereby allowing the obstacle-mounting wheelchair to smoothly mount the obstacle.

Each obstacle-mounting guide member may be adapted to be attached to the frame structure of a respective belted support member. Alternatively, each obstacle-mounting guide member may be adapted to be attached to a respective opposite side of the frame of the wheelchair. The obstacles of a defined size may be sidewalk curbs, steps, or thresholds.

The frame structure may be formed such that the periphery of the frame structure extends immediately adjacent the defined path of the endless belt. A first portion of the periphery of the frame structure extends immediately adjacent the first segment of the defined path of the endless belt. The periphery of the frame structure may have a series of rotary bearings rotatably secured thereto and extending in parallel, generally-equally-spaced relation therearound, the series of bearings extending between the endless belt and the periphery of the frame structure and allowing low-friction movement of the endless belt around the periphery of the frame structure. The periphery of the frame structure may have a generally triangular shape.

The second part of each guide member may include an arm normally extending upwardly forwardly on the wheelchair, first rotary member means mounted on one end of the arm, second rotary member means mounted on the other end of the arm, and an endless belt means extending around the first and second rotary member means. The endless belt means of each guide member is that part of the guide member that contacts the obstacle. The endless belt means rotates around the first and second rotary member means while maintaining contact with the obstacle as the second part of the guide member initially rotates to compress the respective resilient member and then returns toward its original position.

The one end of each pendulum member that is pivotally mounted on the frame structure of a respective belted support may have a series of holes extending therethrough. Each hole is adapted to receive a pivot pin that extends from the frame structure, each hole being incrementally angularly offset from each other such that a plane of the respective belted support member may assume a series of different lateral angles relative to the pendulum member.

A plate may be mounted between the one end of each pendulum member and the respective belted support member. The plate is mounted so as to remain both pivotally fixed on a pivot pin relative to the pendulum member and parallel to a plane of the belted support member. A range of relative pivotal movement between the pendulum member and the respective belted support member is determined by a pair of adjustably-positionable stops on the respective plate.

BRIEF DESCRIPTION OF THE DRAWINGS

Next, the invention will be more fully described by means of preferred embodiments utilizing the accompanying drawings, in which:

FIGS. 8 to 12 illustrate five sequential side views of a wheelchair of the second embodiment mounting a curb, the views illustrating the action of the guide members in lifting the forward end of the wheelchair over the curb; and, FIGS. 13 to 15 illustrate three positions for the pair of locking members on the rotation-limiting plate that is positioned between each member and the respective belted support member.

DETAILED DESCRIPTION OF THE PREFERRED EMBODIMENTS

Figure 1:
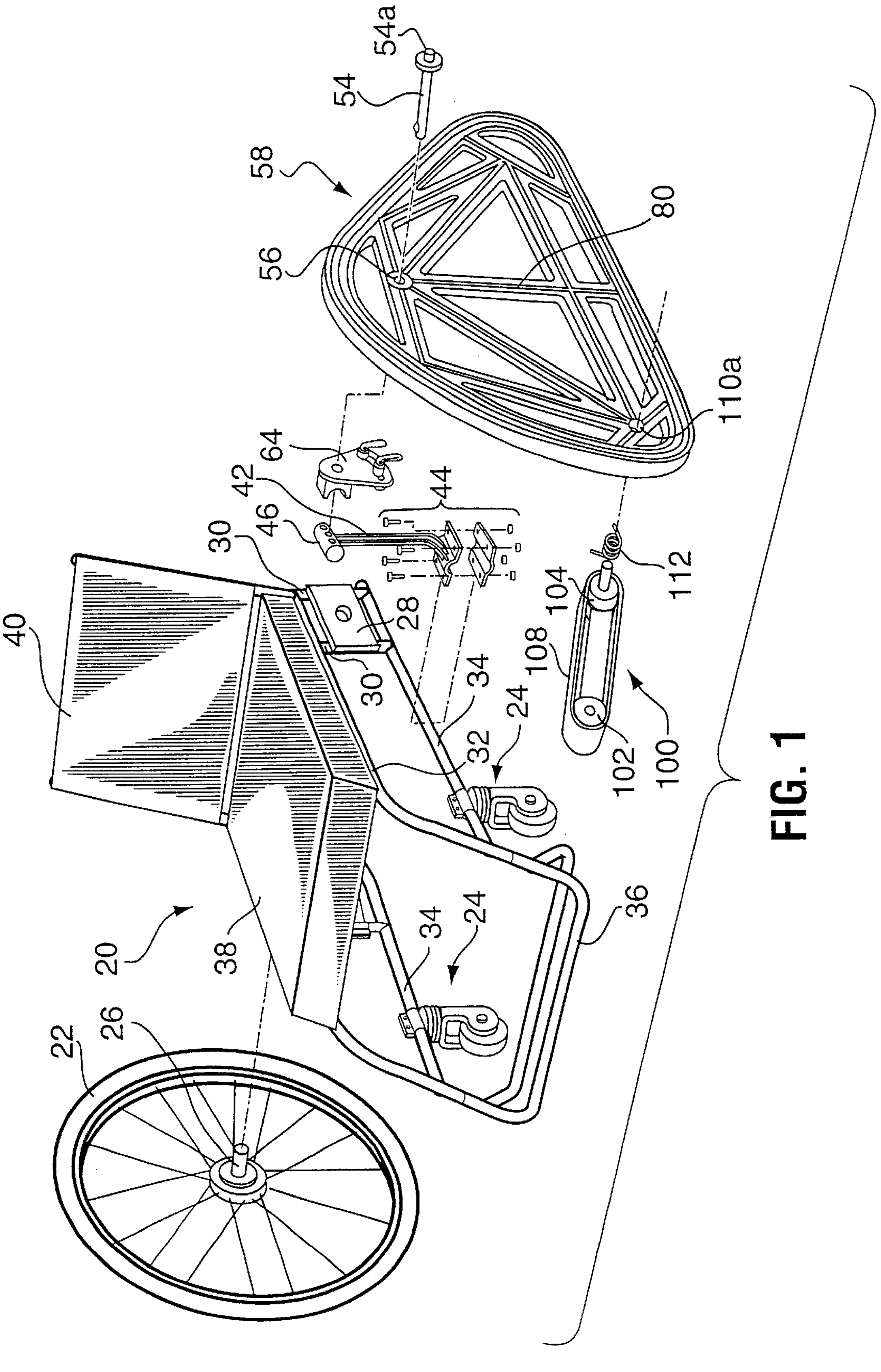
FIG. 1 is an exploded view of a first embodiment of the obstacle-mounting wheelchair of the invention, the view showing a conventional wheelchair frame with one of its large rear wheels and a pair of smaller front wheels.
Figure 1A:
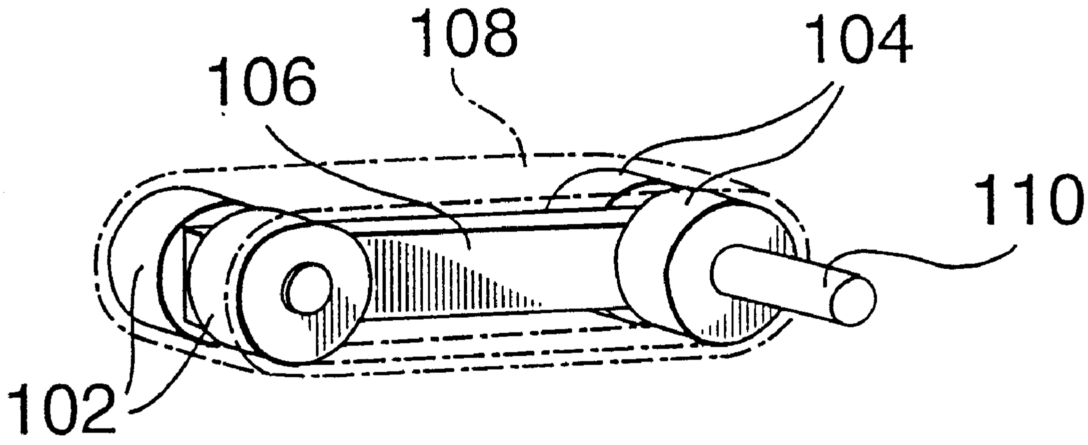
FIG. 1*a* is an enlarged view of the obstacle-mounting guide member of FIG. 1.
Figure 1B:
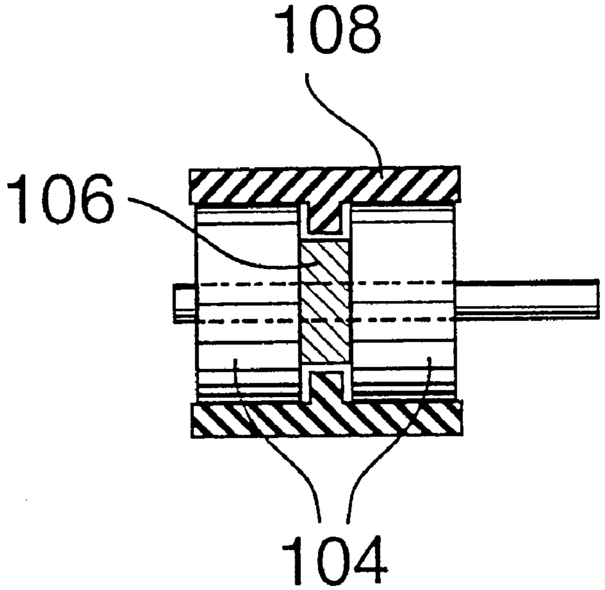
FIG. 1*b* is a cross-sectional view through the guide member of FIG. 1*a*, the view being taken at a point midway between the two pairs of rollers and looking toward the end of the guide member that has the protruding axle.

With reference to FIG. 1, a conventional wheelchair has a frame generally designated 20 with a pair of large rear wheel members, one of which is shown and designated 22, and a pair of smaller front wheel members 24. Each rear wheel 22 has an axle member 26 rotatably mounted thereon, the axle member 26 extending into a central hole of a respective bracket 28 extending between two vertical arms 30 of the frame 20. The two vertical arms 30 are fixed to one end of an upper horizontal arm 32 and a lower horizontal arm 34, with the other end of each horizontal arm 34 being welded to an angled portion of horizontal arm 32, as shown in FIG. 1. Each front wheel member 24 comprises a bracket having its one end secured to a respective one of the lower horizontal arms 34, and having a small wheel rotatably (and pivotably) mounted on its other end. A forked footrest member 36 is connected to the forward ends of the upper horizontal arms 32. A seat 38 is fitted across the horizontal arms 32, as shown in FIG. 1, and a backrest 40 extends at an upward backward angle from the rear of seat 38.

Figure 7:
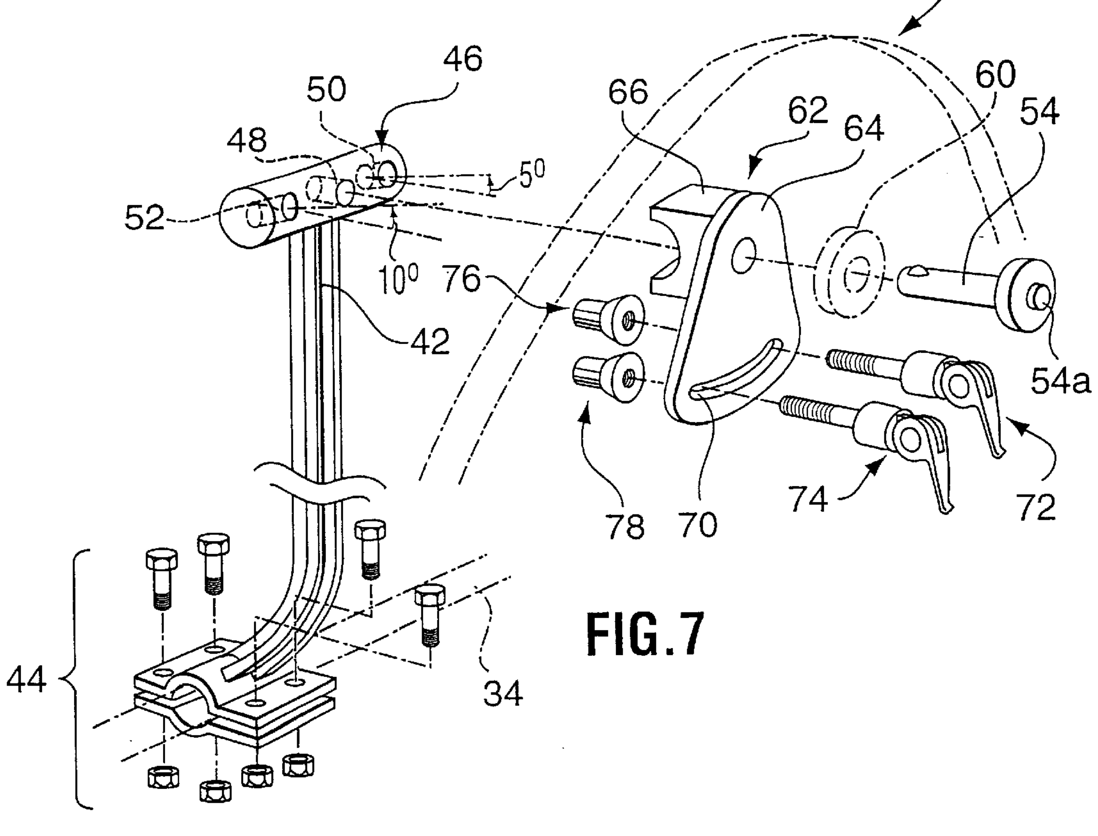
FIG. 7 is an exploded view of a pendulum member and a rotation-limiting plate that connect the wheelchair frame with a respective belted support member.

To create the obstacle-mounting wheelchair of the invention, the pair of rear wheel members 22 and front wheel members 24 are first removed. A pair of pendulum members 42 are each bolted onto a respective lower horizontal arm 34 by a respective bracket 44 positioned at one end of each pendulum member 42. Each bracket 44 is positioned on respective lower horizontal arm 34 such that the amount of weight that is forward of each bracket 44 is approximately the same as the amount of weight that is behind it. The body of each pendulum member 42 is formed with a '+' cross-section. The other end of each pendulum member 42 is a solid cylinder 46 whose longitudinal axis is perpendicular to member 42 and, once pendulum member 42 has been fitted to lower horizontal arm 34, extends parallel to the arm 34. As shown in FIG. 7, each solid cylinder 46 has a series of diametric holes, a central one 48 of the holes extending normal to the body of the pendulum member 42, a hole 50 on one side of central hole 48 extending at a 5° angular offset from the central hole, and a hole 52 on the other side of central hole 48 extending at a 10° angular offset. The effect of the angular offset of the holes is that when pivot pins 54, inserted through the holes 56 in the generally-triangular-shaped belted support members 58, are fitted into respective central holes 48, the pair of belted support members extend parallel to each other and each extends normal to the ground. If the holes 50 are used instead of the holes 48, the belted support members 58 are splayed, with the distance between the base of the belted support members 58 being greater than the distance between the top portions of members 58. If the holes 52 are used, the distance between the base of the belted support members 58 in increased even further. For athletic users of the wheelchair, there are advantages to having such slight splay between the pair of belted support members 58.

As shown in FIG. 7, each pivot pin 54 passes through the hole 56 in the respective belted support member 58. A washer 60 is inserted over pivot pin 54 on the other side of the hole 56, and a rotation-limiting plate member 62 is fitted over pin 54. The plate member 62 has a generally triangular plate 64 on which is mounted a cupped member 66 having a curvature matching the outside of solid cylinder 46. Pin 54 then is fitted through one of the three diametric holes in solid cylinder 46 by pushing button 54(a) on the proximal end of pin 54, and is retained in place by the inherent action of the detent pin 54 where a spring loaded ball bearing inside pin 54 protrudes from near the distal end of the pin 54 and thus exceeds the hole 48 diameter and prevents pin 54 from disengaging. The effect of this arrangement is that the plane of plate 64 is maintained parallel to the plane of belted support member 58, but at the same time is prevented by cupped member 66 from rotating relative to the respective pendulum member 42.

Figure 13:
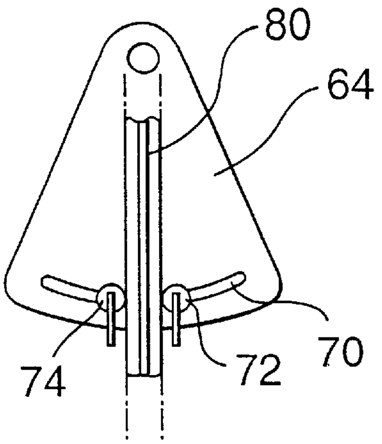
Figure 14:
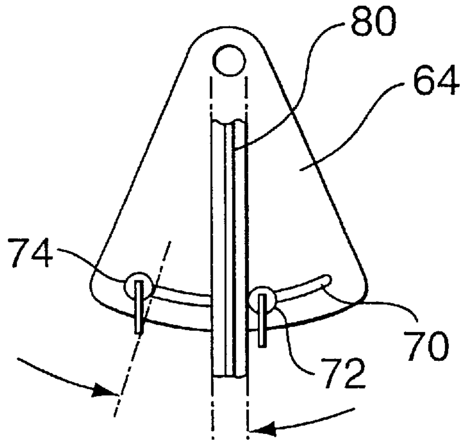
Figure 15:
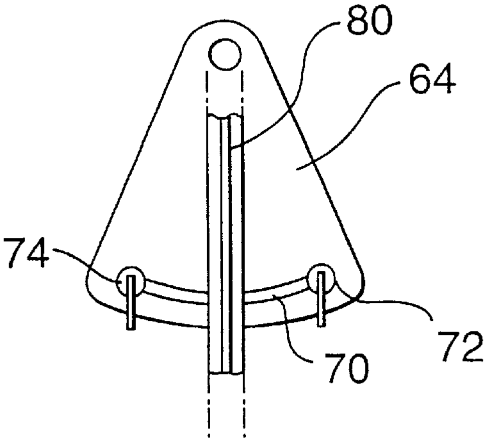

As shown in FIGS. 7 and 13 to 15, triangular plate 64 has a curved opening 70 in its broader end. Two locking stop members 72 and 74 each have a stem portion that extends through the curved opening 70, and respective end plugs 76 and 78 that are fitted to the end of the respective stem portions. By rotating the head portions of the stop members 72 and 74, those stop members may be secured into fixed positions along the curved opening 70. The stop members 72 and 74 sit on opposite sides of a generally-vertical beam 80 of the belted support member 58, and their positions limit the relative rotation between the belted support member 58 and the member 42, and thus frame 20 of the wheelchair. As best shown in FIGS. 13 to 15, the positions at which the stop members 72 and 74 are locked into place on the plate 64 determines the amount of travel and the angular limits of the relative rotation between the frame 20 and the belted support members 58. This feature is one that is adjustable by an occupant of the wheelchair to enhance the ease with which the wheelchair moves over an obstacle such as a curb, or to optimize comfort over prolonged inclines or descents by allowing frame 20 to remain upright (seat 38 horizontal) under any operation of the wheelchair.

Figure 3:
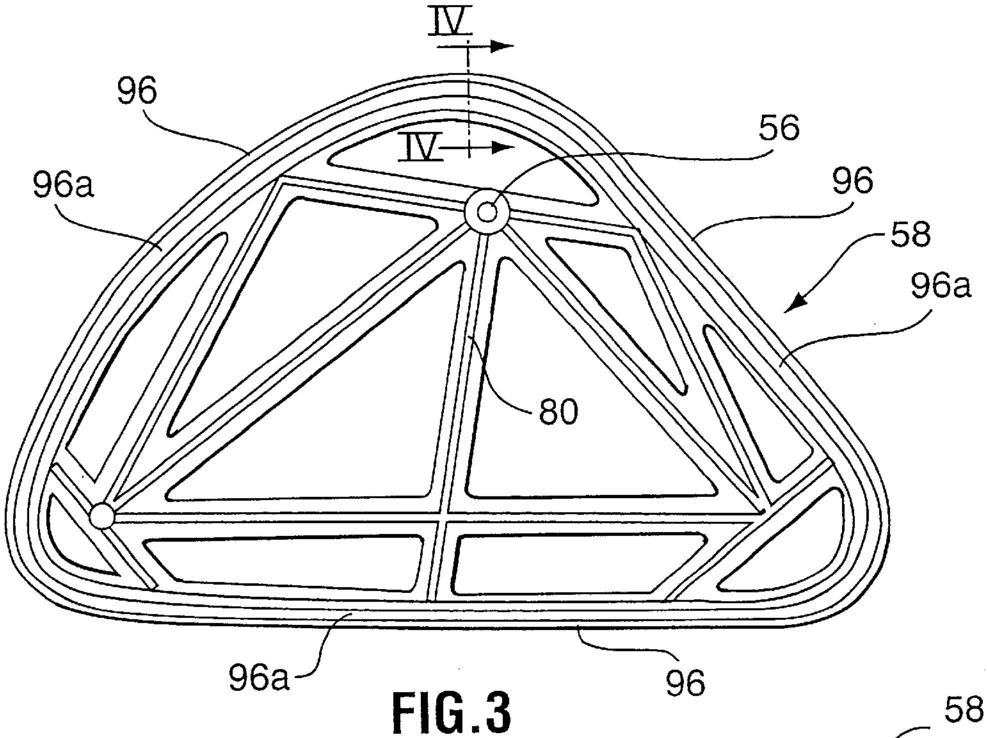
FIG. 3 is a side view of a belted support member adapted to be fitted through a pendulum member to a frame of the wheelchair.
Figure 4:
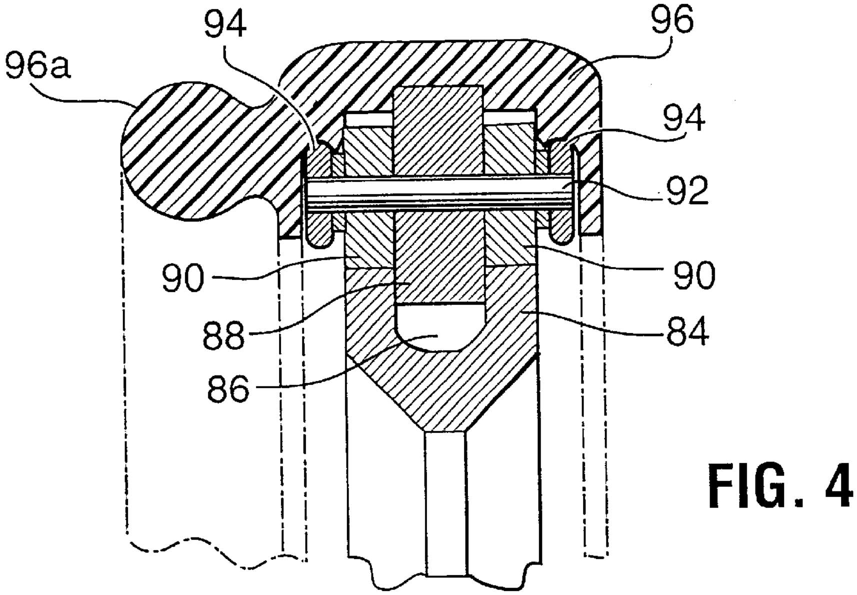
FIG. 4 is a cross-sectional view through the line IV—IV of the belted support member of FIG. 3.
Figure 5:
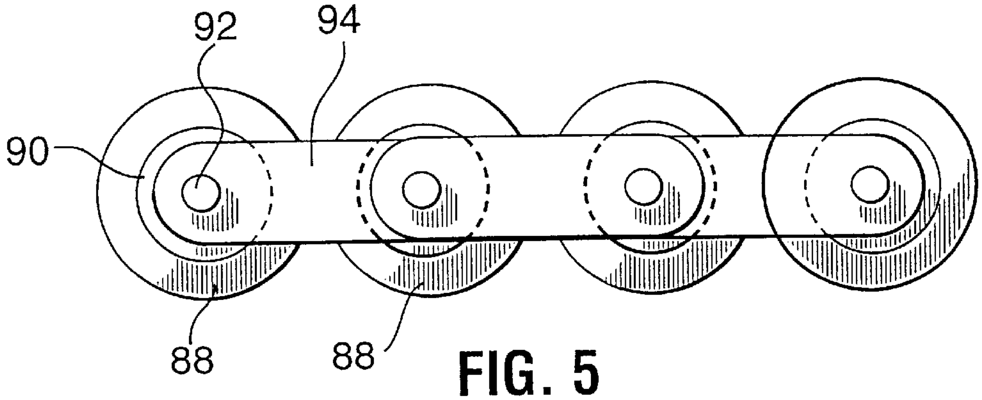
FIG. 5 is a side view of a portion of the train of rollers that extend around the periphery of the belted support member of FIG. 3.
Figure 6:
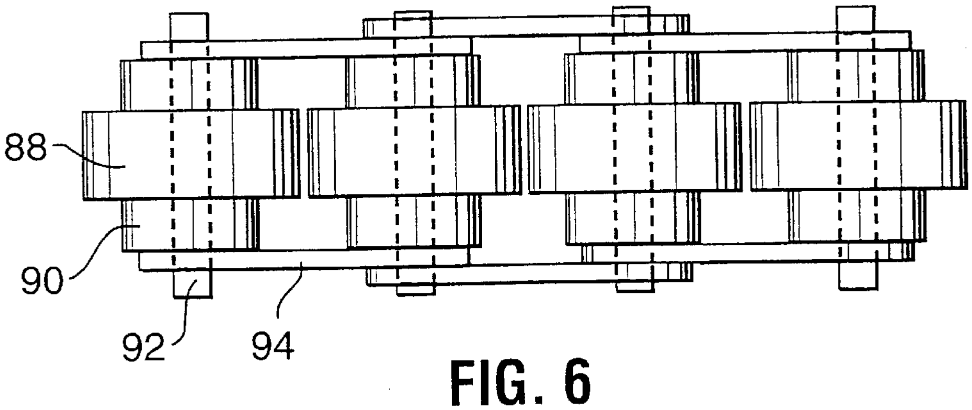
FIG. 6 is a top view of the portion of the train of rollers of FIG. 5.

The peripheral construction of each belted support member 58 is illustrated in FIGS. 4, 5 and 6. The frame of belted support member 58 is a structural web with support members connected at angles to each other as shown in FIG. 3. Each support member has a cross-section that is shaped in the form of a '+'; this provides an excellent strength-to-weight ratio. The periphery of each belted support member 58 is a continuous arcuate member 84 to which the support members connect and provide support. As shown in FIG. 4, a longitudinal groove 86 extends the length of the continuous arcuate member 84, i.e. all around the periphery. Into the groove 86 is fitted a connected train of central rollers 88, as shown in the side and top views in FIGS. 5 and 6, respectively. On each side of each central roller 88 is a side roller 90. A pivot pin 92 extends through each central roller 88 and its associated pair of side rollers 90. Adjacent pairs of pivot pins 92 have their ends connected together by link members 94. Riding on top of the rollers 88 is a continuous rubber belt 96. Because of the underlying roller bearing construction, the rubber belt 96 moves freely around the periphery of the belted support member 58. An occupant of the wheelchair powers it forward by placing his or her hands on the parallel contour 96(*a*) of the rubber belt 96 at the forward end of the wheelchair, and moving the belt 96 downwardly and forwardly. As the belt 96 moves around the periphery of the belted support member 58, support member 58 advances across the ground.

The outer contour of each belted support member 58 is shown in FIG. 3. The bottom periphery of the support member 58 is slightly arched, such that only a portion of the bottom periphery touches the ground at any one time. This reduces ground friction, and also allows rapid turning of the wheelchair. A forward upper periphery of the support member 58 is prominently arched to assist an occupant in grasping the belt contour 96(*a*) of the belt 96 extending thereon, while a forward rear periphery is generally straight.

The obstacle-mounting guide members, generally designated as 100, may be mounted on the wheelchair in one of two ways. In the first embodiment, shown in FIG. 1, each guide member 100 is pivotally mounted on a front end of a respective belted support member 58. In the second embodiment, shown in FIG. 2, each guide member 100 is pivotally mounted on the other end of the upper horizontal arm 32 after the footrest member 36 has been removed.

Each guide member 100 is formed by a pair of front rollers 102 and a pair of rear rollers 104 rotatably mounted on opposite ends of a beam 106. One end of the beam 106 sits intermediate between the rollers 102, and the other end of the beam sits between the rollers 104. A belt 108 is mounted around the rollers 102 and 104, and freely rotates on the periphery. An axle 110 extends out of one side of the pair of rear rollers 104. Around the axle sits a helical spring member 112. In the first embodiment, shown in FIG. 1, the axle 110 is secured to a hole 110(*a*) at a lower front section of belted support member 58. One end of helical spring member 112 is secured to beam 106, and the other end is secured to belted support member 58 so as to suspend guide member 100 on the belted support member 58 at an upward forward rest angle of about 30° to the horizontal. If upward rotational pressure is exerted on guide member 100, it always returns to its original position at the rest angle once the pressure is released. The helical spring member 112 has a high spring constant such that an upward rotation of approximately 30° is sufficient for a reaction that attempts to raise the forward end of the belted support member while an occupant is sitting in the wheelchair. The exact value of the spring constant would depend in part upon the weight of the wheelchair occupant.

Figure 2:
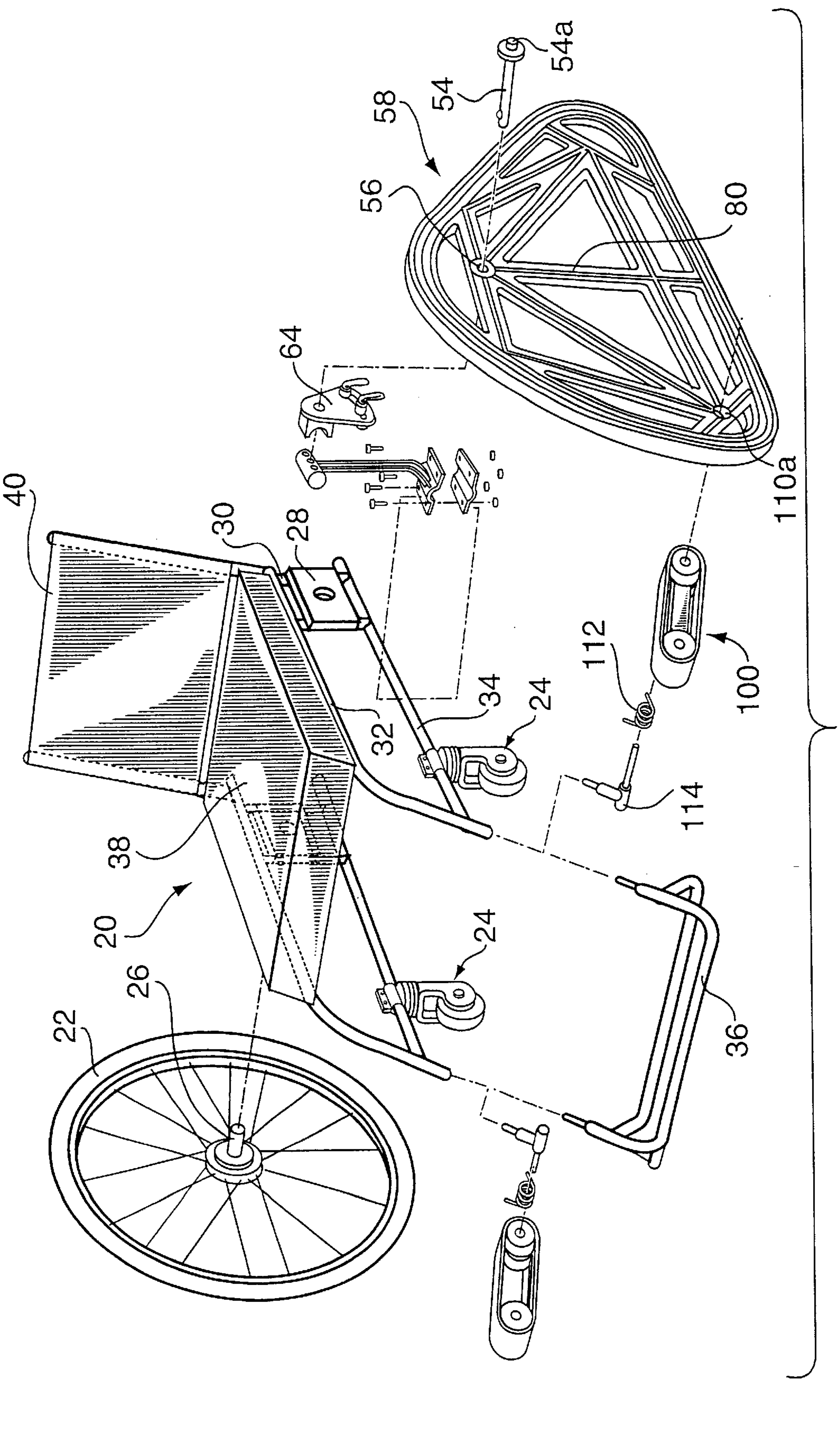
FIG. 2 is an exploded view of a second embodiment of the obstacle-mounting wheelchair of the invention, the view being similar to FIG. 1 except for the connection of the guide members to the wheelchair.

FIG. 2 illustrates a second embodiment, in which the guide members 100 are each instead fitted to a bottom front end of a respective one of the upper horizontal arms 32 after the footrest member 36 has been removed. In this case, the spring member 112 is fitted around a lower lateral extension of an elbow 114, the upper end of which is fitted into the bottom end of the tube at the end of the respective upper horizontal arm 32. An inner end of spring member 112 is secured against rotation on elbow 114, and the outer end is secured to beam 106 of the guide member 100.

FIGS. 8 to 12 illustrate the sequence of events that occur as the obstacle-mounting wheelchair of the invention approaches and surmounts a curb.

In FIG. 8, the belt 108 has just come into contact with the apex of the curb. In FIG. 9, the guide member 100 is rotating clockwise, with the belt 108 simultaneously rotating counterclockwise around the outside of guide member 100 as the same point on the belt 108 remains in contact with the apex of the curb. In FIG. 10, the spring constant on the spring members 112 has caused the guide members 58 to rotate back counterclockwise, causing the front of the belted support members 58 and thus the front of the wheelchair to lift further off the ground. The belt 108 is continuing to move counterclockwise on the periphery of each guide member 100 until the apex of the curb moves past the position of the rear rollers 104 and comes against the front end of belted support member 58, as shown in FIG. 10. The belt 96 is meanwhile rotating counter-clockwise around the periphery of belted support member 58, and as the belt 96 continues to rotate, the wheelchair rides up and over the apex of the curb (FIGS. 11 and 12). Tests have been run on this wheelchair, and it has been found that the wheelchair glides up and over sidewalk curbs with little disturbance to the occupant of the wheelchair. Further, with reference to FIG. 1, where the guide members 100 are fitted directly to belted support member 58, the occupant may choose to enhance comfort by positioning the stop members 72 and 74 as depicted in FIG. 15 so as to allow the wheelchair designated 20 to "cradle" about the belted support members 58. While the lower belt member 96 at the arcuate member 84 increase in angle from the ground going over obstacles, the seat 38 may remain generally horizontal to the ground.

I claim:

1. A wheelchair conversion kit for converting into an obstacle-mounting wheelchair a conventional wheelchair having a frame, a main pair of circular wheels each mounted on a respective opposite side of the rear of the frame, and a steerable smaller pair of circular wheels each mounted on a respective opposite side of the frame forward of the main pair of circular wheels, parts in the kit being adapted to be fitted to the frame after removal of the main pair and smaller pair of circular wheels, the parts in the kit comprising:

- a pair of belted support members each adapted to be fitted to a respective side of the frame, each of the belted support members comprising:
  - a frame structure on the periphery of which are mounted a series of load-bearing rotatable members;
  - an endless belt mounted on the series of load-bearing rotatable members, the rotatable members configuring peripheral movement of the belt around the frame structure into a defined path, a first segment of the defined path being adapted to extend proximate to a surface of ground traversed by the obstacle-mounting wheelchair, the first segment having a shallow convex curvature such that only a portion of the first segment of the defined path of the belt is in contact with the ground at any one time; and,
  - a pendulum member having one end pivotally mounted on the frame structure of the belted support member, the pendulum member being adapted to extend downwardly in use from its one end, and having its other end adapted to be attached to the respective side of the wheelchair frame; and,
  - a pair of obstacle-mounting guide members, each guide member having a first part adapted to be attached at a forward position on the wheelchair, and having a second part connected by a respective resilient member to the first part and biased so as to normally extend in an upwardly forwardly direction on the wheelchair;

wherein, when the obstacle-mounting wheelchair encounters obstacles of a defined size or less during forward movement, each second part of the guide members initially rotates to compress or retract the respective resilient member after first contact with the obstacle, the resilient members then acting to return the second parts toward their original positions, the action of the second parts in returning toward such original positions lifting a forward end of the first segment of the defined path of each belt and thereby allowing the obstacle-mounting wheelchair to smoothly mount the obstacle.

2. The wheelchair conversion kit of claim 1, wherein each obstacle-mounting guide member is adapted to be attached to the frame structure of a respective belted support member.

3. The wheelchair conversion kit of claim 1, wherein each obstacle-mounting guide member is adapted to be attached to a respective opposite side of the frame of the wheelchair.

4. The wheelchair conversion kit of claim 1, wherein the obstacles of a defined size are sidewalk curbs, steps, or entrance thresholds.

5. The wheelchair conversion kit of claim 1, wherein the frame structure is formed such that the periphery of the frame structure extends immediately adjacent the defined path of the endless belt, a first portion of the periphery of the frame structure extending immediately adjacent the first segment of the defined path of the endless belt.

6. The wheelchair conversion kit of claim 5, wherein the periphery of the frame structure has a series of rotary bearings rotatably secured thereto and extending in parallel, generally-equally-spaced relation therearound, the series of bearings extending between the endless belt and the periphery of the frame structure and allowing low-friction movement of the endless belt around the periphery of the frame structure.

7. The wheelchair conversion kit of claim 6, wherein the periphery of the frame structure has a generally triangular shape.

8. The wheelchair conversion kit of claim 1, wherein the second part of each guide member comprises:

- an arm normally extending upwardly forwardly on the wheelchair;
- first rotary member means mounted on one end of the arm;
- second rotary member means mounted on the other end of the arm; and,
- an endless belt means extending around the first and second rotary member means;

wherein the endless belt means of each guide member is that part of the guide member that contacts the obstacle, and wherein the endless belt means rotates around the first and second rotary member means while maintaining contact with the obstacle as the second part of the guide member initially rotates to compress or retract the respective resilient member and then returns toward its original position.

9. The wheelchair conversion kit of claim 1, wherein the one end of each pendulum member that is pivotally mounted on the frame structure of a respective belted support member has a series of holes extending therethrough, each hole being adapted to receive a pivot pin that extends from the frame structure, each hole being incrementally angularly offset from each other hole such that a plane of the respective belted support member may assume a series of different lateral angles relative to the pendulum member.

10. The wheelchair conversion kit of claim 1, wherein a plate is mounted between the one end of each pendulum member and the respective belted support member, the plate being mounted so as to remain both pivotally fixed on a pivot pin relative to the pendulum member and parallel to a plane of the belted support member, a range of relative pivotal movement between the pendulum member and the respective belted support member being determined by a pair of adjustably-positionable stops on the respective plate.

11. The wheelchair conversion kit of claim 9, wherein a plate is mounted between the one end of each pendulum member and the respective belted support member, the plate being mounted so as to remain both pivotally fixed on the pivot pin relative to the pendulum member and parallel to the plane of the belted support member, a range of relative pivotal movement between the pendulum member and the respective belted support member being determined by a pair of adjustably-positionable stops on the respective plate.

* * * * *